United States Patent [19]

Baumann et al.

[11] 4,136,086

[45] Jan. 23, 1979

[54] CURABLE EPOXIDE RESIN MIXTURES

[75] Inventors: Dieter Baumann, Rheinfelden; Heinz Rembold, Arlesheim, both of Switzerland

[73] Assignee: Ciba-Geigy Corporation, Ardsley, N.Y.

[21] Appl. No.: 879,282

[22] Filed: Feb. 21, 1978

[30] Foreign Application Priority Data

Mar. 10, 1977 [CH] Switzerland ................... 3028/77

[51] Int. Cl.² ......................................... C08G 59/66
[52] U.S. Cl. ................................. 528/99; 260/830 S; 528/363; 528/364
[58] Field of Search ........ 260/47 EC, 78.41, 830 TW, 260/830 S

[56] References Cited

U.S. PATENT DOCUMENTS

| | | | |
|---|---|---|---|
| 2,849,416 | 8/1958 | Bender et al. | 260/43 |
| 3,355,512 | 11/1967 | DeAcetis et al. | 260/830 |
| 3,472,913 | 10/1969 | Ephraim | 260/830 |
| 3,670,046 | 6/1972 | Tomalia et al. | 260/830 S |
| 3,746,685 | 7/1973 | Dobinson et al. | 260/47 EC |
| 3,978,151 | 8/1976 | Strong | 260/830 S |

*Primary Examiner*—Lester L. Lee
*Assistant Examiner*—E. A. Nielsen
*Attorney, Agent, or Firm*—Joseph F. DiPrima

[57] ABSTRACT

Curable mixtures of (a) epoxide compounds, (b) adducts containing mercapto groups, which adducts are produced by an advancement reaction of dimercapto compounds with diglycidyl compounds in an amount less than the equivalent amount, and (c) carboxylic anhydrides. The curable mixtures are suitable as casting resin mixtures, particularly for producing moulded articles of large volume.

10 Claims, No Drawings

CURABLE EPOXIDE RESIN MIXTURES

The present invention relates to curable mixtures based on epoxide compounds, dimercapto compounds and polycarboxylic anhydrides, and to the use of the curable mixtures for producing moulding materials.

It is known that the curing of epoxide resins with carboxylic anhydrides can be accelerated by the addition of polymercaptan compounds. It is disclosed in German Offenlegungsschrift No. 2,400,948 that certain polymercaptan compounds which have an SH-functionality greater than 2.5 can be readily mixed with epoxide resins and carboxylic anhydrides to form mixtures which can be cured at ambient temperatures. These resin systems prove however to be too reactive for many technical applications. In consequence of the relatively high amount of exothermic heating occurring during gelling of these resin mixtures, the substrates or objects to be coated can easily become damaged; and in the production of moulded articles having a large volume there is a tendency for bubbles and cracks to form.

In Example 3 of the stated German Offenlegungsschrift No. 2,400,948, it is furthermore shown by a comparative example that a polymercaptan compound having an SH-functionality of about 2.3, i.e. less than 2.5, is not suitable for anhydride curing of epoxide resins, since these mixtures are still in the form of viscous liquids after a curing time of 6 hours at 132° C.

It has now been found that specific adducts containing mercapto groups, which are obtained by an advancement reaction of dimercapto compounds with diglycidyl compounds, constitute when mixed with epoxide compounds and caboxylic anhydrides valuable curable resin systems, which can be readily cured and which do not have the disadvantages described above. The new curable epoxide resin mixtures are characterised in particular by the fact that only a moderate amount of exothermic heating occurs during gelling and curing of these mixtures, so that in the production especially of large-volume moulded articles there is no tendency for bubbles and cracks to form.

The present invention relates therefore to a curable mixture based on epoxide compounds, dimercapto compounds and polycarboxylic anhydrides, which curable mixture comprises (a) an epoxide compound having on an average more than one 1,2-epoxide group in the molecule, (b) an adduct containing mercapto groups, which is obtained by reaction of n mol of a diglycidyl compound with n+1 mols of an aliphatic or aromatic dimercapto compound, where n denotes an integer, and (c) a polycarboxylic anhydride, the amounts contained being such that there are present in the curable mixture 0.1 to 0.5 equivalent of mercapto groups of the adduct (b) and 0.9 to 0.5 equivalent of an anhydride group of the polycarboxylic anhydride (c), per 1 equivalent of an epoxide group of the epoxide compound (a).

There are preferably contained in the curable mixtures 0.2 to 0.4 equivalent of mercapto groups of the adduct (b) and 0.8 to 0.6 equivalent of an anhydride group of the polycarboxylic anhydride (c), per 1 equivalent of an epoxide group of the epoxide compound (a).

Suitable epoxide compounds (a) are in particular those having on an average more than one glycidyl group, β-methylglycidyl group or 2,3-epoxycyclopentyl group bonded on a hetero atom (e.g. sulphur, preferably oxygen or nitrogen); compounds which may be mentioned are especially bis-(2,3-epoxycyclopentyl)-ether, di- or polyglycidyl ethers of polyhydric aliphatic alcohols such as 1,4-butanediol, or polyalkylene glycols such as polypropylene glycols; di- or polyglycidyl ethers of cycloaliphatic polyols such as 2,2-bis-(4-hydroxycyclohexyl)-propane; di- or polyglycidyl ethers or polyvalent phenols such as resorcinol, bis-(p-hydroxyphenyl)-methane, 2,2-bis-(p-hydroxyphenyl)-propane (= diomethane), 2,2-bis-(4'-hydroxy-3',5'-dibromophenyl)-propane, 1,1,2,2-tetrakis-(p-hydroxyphenyl)-ethane, or of condensation products of phenols with formaldehyde, obtained under acid conditions, such as phenol-novolaks and cresol-novolaks; di- or poly-(β-methylglycidyl)-ethers of the aforementioned polyhydric alcohols or polyvalent phenols; polyglycidyl esters of polyvalent carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyltoluidine, N,N,N',N'-tetraglycidyl-bis-(p-aminophenyl)-methane; triglycidyl-isocyanurate; N,N'-diglycidylethylene urea; N,N'-diglycidyl-5,5-dimethylhydantoin, N,N'-diglycidyl-5-isopropyl-hydantoin; and N,N'-diglycidyl-5,5-dimethyl-6-isopropyl-5,6-dihydro-uracil.

It is however possible to use as epoxide compounds (a) also those from the known class of cycloaliphatic epoxide resins, such as 3,4-epoxy-6-methylcyclohexylmethyl-3',4'-epoxy-6'-methylcyclohexanecarboxylate or 3,4-epoxyhexahydrobenzal-3',4'-epoxycyclohexane-1',1'-dimethanol.

For reducing the viscosity, there can if desired be added to the epoxide compounds (a) active diluting agents, such as styrene oxide, butylglycidyl ether, isooctylglycidyl ether, phenylglycidyl ether, cresylglycidyl ether, glycidyl esters of synthetic, highly-branched, mainly tertiary aliphatic monocarboxylic acids ("CARDURA E").

Epoxide compounds (a) which are particularly used are liquid or viscous epoxide compounds, such as the di- and polyglycidyl ethers of polyphenols, especially of 2,2-bis-(p-hydroxyphenyl)-methane, resorcinol or phenol-novolaks and cresol-novolaks.

The adducts (b) containing mercapto groups are known compounds, and can be produced for example by the process described in the German Offenlegungsschrift No. 2,000,041, which comprises reacting at elevated temperature, preferably in the temperature range of 50° to 120° C., n mols of a diglycidyl compound with n+1 mols of an aliphatic or aromatic dimercapto compound, with n representing an integer. Preferably, 1 mol or 2 mols of a diglycidyl compound is reacted with 2 or 3 mols of the dimercapto compound. The molar ratio of diglycidyl compound to dimercapto compound is in particular 1:2. Suitable diglycidyl compounds are the same as those already mentioned among the epoxide compounds (a), i.e. compounds wherein the two glycidyl groups are bound by way of an O, S or N atom to the aliphatic, cycloaliphatic, aromatic or heterocyclic radical. The liquid and viscous diglycidyl compounds again are preferred for producing the adducts; however, also the N-diglycidyl compounds, especially the N,N-heterocyclic diglycidyl compounds, constitute a class of compounds preferably used. The aliphatic or aromatic dimercapto compounds usable for producing the adducts containing mercapto groups contain preferably not more than 12 C atoms, which can be bound together by way of —S— or —O— bridges, per molecule. The following may be mentioned as examples of suitable dimercapto compounds (dithiols): 1,2-dimercaptoethane, 1,2-dimercaptopropane, 1,3-dimercaptopropane, 2,3-dimercapto-1-propanol, 1,2-dimercaptobutane, 1,4-dimercaptobutane, 2,2'-dimercaptodiethyl ether, bis-(2-mercaptoethyl)-sulphide, α,ω-diethylene glycol dimercaptan, α,ω-triethylene glycol dimercaptan, 1,6-dimercaptohexane, 1,8-dimercaptooctane, 1,9-dimercaptononane, 1,10-dimercaptodecane, 1,12-dimercaptodecane, 4,5-dimethyl-o-xylylene-α,α-dithiol and toluylene-3,4-dithiol. The aliphatic dimercapto compounds are a class of compounds preferably used.

The polycarboxylic anhydrides (c) used can be, for example, the cycloaliphatic polycarboxylic anhydrides, such as tetrahydrophthalic anhydride, methyltetrahydrophthalic anhydride, hexahydrophthalic anhydride, methylhexahydrophthalic anhydride, endomethylenetetrahydrophthalic anhydride, methyl-endomethylenetetrahydrophthalic anhydride (= methyl-Nadic anhydride), the Diels-Alder adduct from 2 mols of maleic anhydride and 1 mol of 1,4-bis-(cyclopentadienyl)-2-butene, the eutectic mixtures of these polycarboxylic acids, and also isomeric mixtures of methyl-substituted tetrahydrophthalic acids, or certain aromatic polycarboxylic anhydrides, such as trimellitic anhydride or pyromellitic anhydride. Cycloaliphatic dicarboxylic anhydrides are preferably used.

In anhydride curing, there can if required be concomitantly used accelerators, such as tertiary amines, e.g. 2,4,6-tris-(dimethylaminomethyl)-phenol, or alkali metal alcoholates, e.g. sodium methylate or sodium hexylate.

The curing of the mixtures curable according to the invention to produce moulded articles or moulding materials is performed advantageously in the temperature range of 30° to 120° C. The curing can be carried out in a known manner also in two stages, for example by slightly gelling the moulding at low temperature, preferably between 30° and 80° C., removing it from the mould and subsequently curing it at elevated temperature (80°–120° C.).

The mixtures curable according to the invention can be used as casting resins, impregnating resins, dip resins, laminating resins, adhesives and bonding agents, and, for the coating of metals, as surface-protecting agents against corrosion, moisture and chemical agents of all kinds. These mixtures are particularly useful for producing moulded parts which are used as insulating components in the electrical industry. The moulded articles produced in this manner have a high mechanical strength, good thermal properties, high adhesive strength and good electrical properties.

PRODUCTION OF ADDUCTS CONTAINING MERCAPTO GROUPS

EXAMPLE A (Adduct A)

300 g (2.05 mols) of α,ω-triethylene glycol dimercaptan is placed into a sulphonating flask, and heated by means of an oil bath to 100° C. There is then slowly added dropwise 193 g (1.00 mol) of 1,3-diglycidyl-5,5-dimethylhydantoin. The reaction is finished after about 30 minutes, and the reaction temperature, which has risen to about 130° C., falls. After about 100 minutes of subsequent reaction at 98°–102° C. in a vacuum which has been increased to 2.5–3.0 Torr, 6.2 percent by weight of volatile fractions are removed from the reaction product. The adduct A obtained in 94% yield is a light-yellow liquid moderately viscous at room temperature, which has a viscosity of approximately 16,000–17,000 cP and a mercapto equivalent weight of 340.

EXAMPLE B (Adduct B)

In the same manner as described in Example A, 1.0 mol of N,N-diglycidylaniline is reacted at 95° C. with 2 mols of α,ω-triethylene glycol dimercaptan in an $N_2$ atmosphere. The reaction is finished after 70 minutes, and the reaction product is then treated for a further 35 minutes in an increased vacuum as described in Example A. The product is subsequently freed at 100° C. and 0.4 Torr from the volatile fractions still present. The adduct B, obtained in 87% yield, is a viscous light-yellow liquid having a viscosity of 5,000 cP and a mercapto equivalent weight of 285.

EXAMPLE 1

100 g of a bisphenol-A-diglycidyl ether with an epoxide content of 5.2 epoxide equivalents/kg (= epoxide resin A), which is liquid at room temperature and which has been produced by reaction of epichlorohydrin with 2,2-bis-(p-hydroxyphenol)-propane (Bisphenol A) in the presence of alkali, is mixed with 45 g of the adduct B described in Example B and 60 g of methyltetrahydrophthalic anhydride (corresponding to a ratio of 1 equivalent of an epoxide group to 0.3 equivalent of a mercapto group and 0.7 mol of an anhydride group) at room temperature, and the mixture is poured into aluminium moulds at 60° C. The casting resin mixture is firstly slightly gelled at 60° C. for a total of 3 hours, and subsequently cured at 120° C. for 4 hours. The properties of the moulded specimen are given in Table I.

EXAMPLE 2

Example 1 is repeated except that, instead of 60 g of methyltetrahydrophthalic anhydride, there is used 55 g of hexahydrophthalic anhydride (corresponding to a ratio of 1 equivalent of an epoxide group to 0.3 equivalent of a mercapto group and 0.7 mol of an anhydride group).

The properties of the moulded specimens are shown in Table I.

EXAMPLE 3

Example 1 is repeated except that, instead of using adduct B, there are now used 45 parts of the Adduct A produced in Example A (corresponding to a ratio of 1 equivalent of an epoxide group to 0.3 equivalent of a mercapto group and 0.7 mol of an anhydride group), and the casting resin mixture is cured for 1 hour at 60° C. and for 6 hours at 100° C. The properties of the moulded specimens obtained are given in Table I.

EXAMPLE 4

The procedure as described in Example 1 is followed except that instead of using 60 parts of methyltetrahydrophthalic anhydride there are used 60 parts of methylhexahydrophthalic anhydride.

The properties of the moulded specimens obtained are shown in Table I.

Table I

Properties of the specimens from Examples 1-4.

|  |  | Example 1 | Example 2 | Example 3 | Example 4 |
|---|---|---|---|---|---|
| flexural strength according to VSM 77103 | (kp/mm$^2$) | 12.7 | 12.6 | 12.5 | 12.0 |
| deflection according to VSM 77103 | (mm) | >20 | 6.8 | 10 | >20 |
| impact bend strength according to VSM 77105 | (kp.cm/cm$^2$) | 30-60 | 10-20 | 15-25 | 30-50 |
| glass transition temperature measured with Perkin-Elmer apparatus "DSC 1B" | (° C) | 69 | 63 | 57 | 64 |
| water absorption after 4 days, 25° C; specimen 25×10×4 mm | (% by weight) | 0.18 | 0.18 | 0.3 | — |
| exothermic reaction, measured at centre of casting resin mixture; weight 80 g; mould dimensions: 10×40×120 mm; air-circulation furnace 60° C, maximum temperature after 21 minutes | (° C) | 107 | 112 | — | 92 |

EXAMPLE 5

100 g of 1-glycidyl-3-(glycidyloxy-2'-propyl)-5,5-dimethylhydantoin having an epoxide content of 6.3 epoxide equivalents/kg is mixed at room temperature with 83 g of methyltetrahydrophthalic anhydride and 41 g of the adduct described in Example A, and the mixture is cast into aluminium moulds at 60° C. The casting resin mixture is firstly gelled at 60° C. for a total of 3 hours, and subsequently cured at 120° C. for 4 hours. The properties of the specimens obtained are given in Table II.

EXAMPLE 6

100 g of 3',4'-epoxycyclohexylmethyl-3,4-epoxycyclohexanecarboxylate having an epoxide content of 7.0 epoxide equivalents/kg is mixed at room temperature with 95 g of methyltetrahydrophthalic anhydride and 47 g of the adduct described in Example A, and the mixture is cast into aluminium moulds heated to 60° C. The casting resin mixture is gelled at 60° C. for a total of 3 hours, and subsequently cured at 120° C. for 4 hours. The properties of the moulded specimens obtained are given in Table II.

EXAMPLE 7

Example 1 is repeated with the difference that, instead of adduct B, there is now used 35 g of the Adduct A produced in Example A, and 70 g of methyltetrahydrophthalic anhydride is added. Mixing is carried out at room temperature, and the mixture is then cast into aluminium moulds heated at 60° C. The casting resin mixture is firstly gelled for a total of 3 hours, and subsequently cured at 120° C. for 4 hours. The properties of the moulded specimens obtained are given in Table II.

EXAMPLE 8

100 g of diglycidyl hexahydrophthalate having an epoxide content of 5.8 epoxide equivalents/kg is mixed with 77 g of methyltetrahydrophthalic anhydride and 38 g of the adduct A, described in Example A, at room temperature, and the mixture is cast into aluminium moulds heated to 60° C. The casting resin mixture is firstly gelled at 60° C. for a total time of 3 hours, and subsequently cured at 120° C. for 4 hours. The properties of the moulded specimens obtained are given in Table II.

Table II

Properties of the moulded specimens obtained according to Examples 5 to 8.

|  | Example 5 | Example 6 | Example 7 | Example 8 |
|---|---|---|---|---|
| glass transition temperature (° C) (Perkin-Elmer DSC 1B) | 63 | 112 | 83 | 67 |
| Martens temperature (° C) (DIN 53458) | 51 | 85 | 72 | 59 |
| flexural strength (kp/mm$^2$) (VSM 77103) | 14.1 | 12.0 | 14.3 | 14.4 |
| deflection (mm) (VSM 77103) | 6.4 (3.9-7.5) | 3.6 (2.9-4.0) | 10.2 (6.6-13.0) | 6.5 (6.3-6.8) |
| impact bend strength (cm.kp/cm$^2$) (VSM 77105) | 14.4 (10-17) | 11.5 (8-14) | 29.0 (12-55) | 16.0 (8-21) |
| weight increase due to immersion in water for 1 hour at 100° C (%) | 2.09 | 0.91 | 0.62 | 1.20 |
| 4 days at room temperature (%) | 0.08 | 0.44 | 0.26 | 0.37 |

We claim:

1. A curable mixture based on epoxide compounds, dimercapto compounds and polycarboxylic anhydrides, which mixture comprises
   (a) an epoxide compound having on an average more than one 1,2-epoxide group in the molecule,
   (b) an adduct containing mercapto groups, which is obtained by reaction of n mol of a diglycidyl compound with n+1 mols of an aliphatic or aromatic dimercapto compound, where n denotes an integer, and
   (c) a polycarboxylic anhydride,
   the amounts contained being such that there are present in the curable mixture 0.1 to 0.5 equivalent of mercapto groups of the adduct (b) and 0.9 to 0.5 equivalent of an anhydride group of the polycarboxylic anhydride (c) per 1 equivalent of an epoxide group of the epoxide compound (a).

2. A mixture according to claim 1, which contains 0.2 to 0.4 equivalent of mercapto groups of the adduct (b)

and 0.8 to 0.6 equivalent of an anhydride of the polycarboxylic anhydride (c) per 1 equivalent of an epoxide group of the epoxide compound (a).

3. A mixture according to claim 1, which contains a polyglycidyl compound as epoxide compound (a).

4. A mixture according to claim 1, which contains a liquid epoxide compound as epoxide compound (a).

5. A mixture according to claim 1, which contains an adduct (b) containing mercapto groups, which adduct has been produced with the use of a liquid diglycidyl compound.

6. A mixture according to claim 1, which contains an adduct (b) containing mercapto groups, which adduct has been produced with the use of an aromatic diglycidyl ether.

7. A mixture according to claim 1, which contains an adduct (b) containing mercapto groups, which adduct has been produced with the use of an N-diglycidyl compound.

8. A mixture according to claim 1, which contains an adduct (b) containing mercapto groups, which adduct has been produced by reaction of 1 mol of a diglycidyl compound with 2 mols of an aliphatic or aromatic dimercapto compound.

9. A mixture according to claim 8, which contains an adduct (b) containing mercapto groups, which adduct has been produced with the use of an aliphatic dimercapto compound.

10. A mixture according to claim 9, which contains an adduct (b) containing mercapto groups, which adduct has been produced with the use of an aliphatic dimercapto compound having not more than 12 C atoms in the molecule.

* * * * *